Patented Jan. 26, 1932

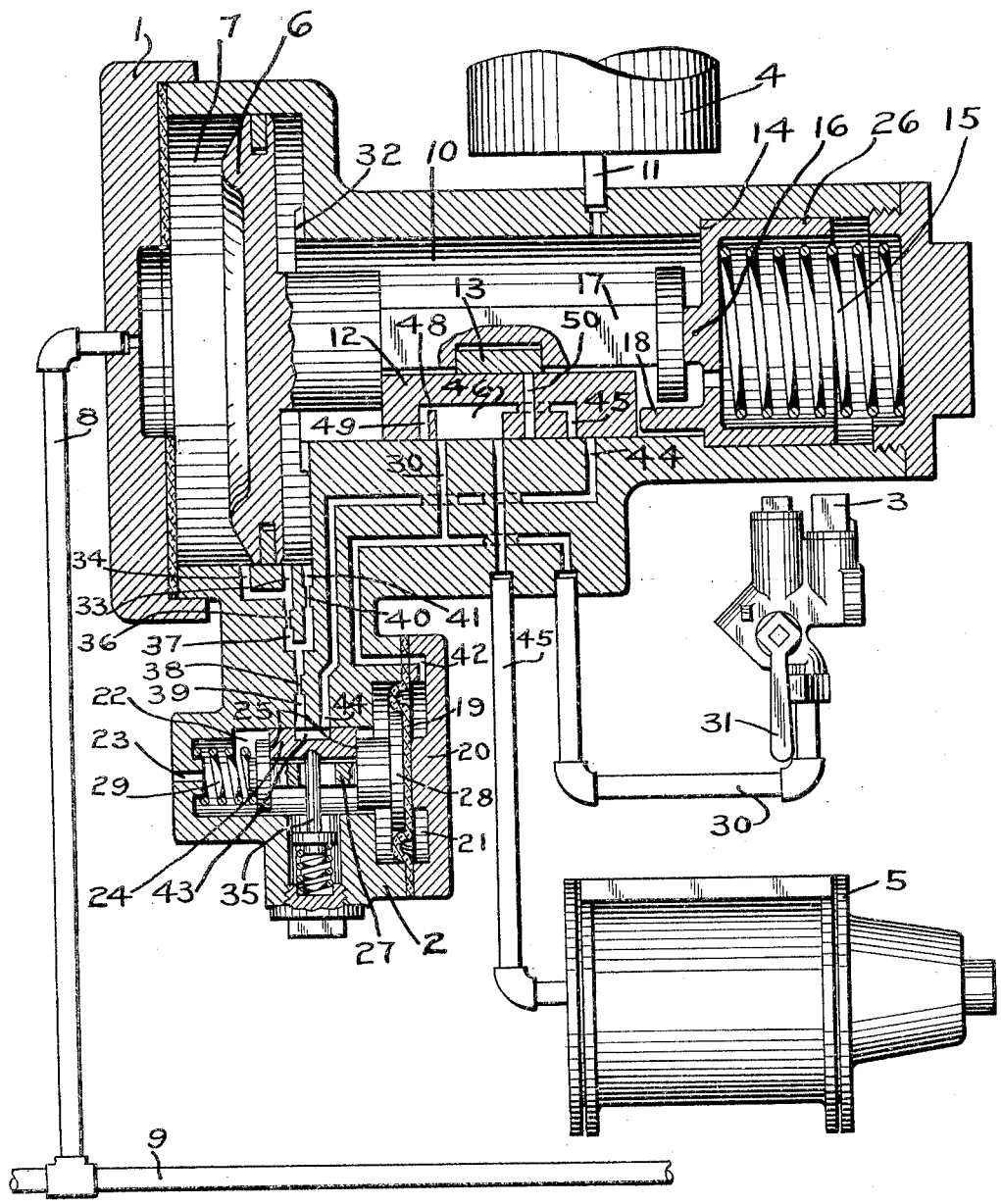

1,842,519

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 6, 1931. Serial No. 513,796.

This invention relates to fluid pressure brakes, and more particularly to the type adapted to operate upon a reduction in brake pipe pressure to effect an application of the brakes and upon an increase in brake pipe pressure to effect a release of the brakes.

It is well known that fluid pressure brakes of the above type apply and release serially from the front end of a train toward the rear end of the train on account of variations in brake pipe pressure being controlled by operation of the usual brake valve device on the locomotive.

In charging the brake pipe to effect a release of the brakes, the brake valve device is initially turned to full release position in which fluid at the high pressure carried in the main reservoir is supplied directly to the brake pipe and then after a predetermined lapse of time, the brake valve device is turned to running position in which the pressure of fluid supplied to the brake pipe is governed by the feed valve device and thus reduced to that normally carried in the brake pipe.

It has heretofore been proposed to provide a brake controlling valve device which is movable upon a rapid rate of increase in brake pipe pressure, such as occurs on cars at the head end of the train, when the brake valve device is placed in full release position, to a position in which the flow of fluid from the brake pipe to the auxiliary reservoir is restricted, so that an increased flow of fluid through the brake pipe to the cars at the rear of the train is provided, and at the same time, the restricted flow tends to prevent an overcharge of the auxiliary reservoir.

On long trains, in order to ensure the release of the brakes on cars at the rear end of the train, it may be necessary to hold the brake valve device in full release position for a relatively long period of time and this may result in the overcharge of the auxiliary reservoirs on cars at the head end of the train even though the flow of fluid from the brake pipe to the auxiliary reservoir is restricted. Theoretically, the flow area of the restricted charging port might be reduced in order to permit the brake valve device to be held for a longer period in full release position without danger of overcharging the auxiliary reservoir, but it is found that a restricted port of the desired small flow area would be impracticable and would be liable to become clogged.

One object of my invention is to provide a brake controlling valve device having means for reducing the rate of recharge of the auxiliary reservoir from the brake pipe on cars at the head end of the train to such an extent that an overcharge of the auxiliary reservoir will not occur during any reasonable period of time which the brake valve device is held in full release position.

In handling a train down a grade, it is customary to "cycle" the brakes, or in other words, to alternately effect an application of the brakes and then charge the brake equipments on the train. A retaining valve device is employed for restricting the venting of fluid under pressure from the brake cylinder down to a certain degree and then for holding the brake cylinder pressure at said degree while the brake equipments are being charged and until another application of the brakes is effected. The retaining valve device is normally carried in a cut-out position in which it is inoperative, but in cycling, is carried in cut-in position for the purpose above described.

Another object of my invention is to provide means for cutting out the overcharge control means when the retaining valve device is cut in, as in cycling.

Other objects and advantages will appear in the following more detailed description of the operation of my invention.

In the accompanying drawing, the single figure is a diagrammatic view, mainly in section, of a fluid pressure brake equipment embodying my invention.

As shown in the drawing, the fluid pressure brake equipment comprises a triple or other brake controlling valve device 1 having associated therewith a release control valve device 2, a retaining valve device 3, an auxiliary reservoir 4, and a brake cylinder 5.

The brake controlling valve device 1 comprises a piston 6 having at one side a chamber 7 connected through a pipe 8 to a brake pipe 9 and at the other side a valve chamber 10 open to the auxiliary reservoir 4 through a passage and pipe 11 and containing a main slide valve 12 and an auxiliary slide valve 13 adapted to be operated by said piston. Mounted in the right hand end of valve chamber 10 is a yielding resistance device comprising a slidable member 26 normally pressed into engagement with a shoulder 14 in the chamber 10 by a spring 15 and having a lug 16 adapted to engage the end of a stem 17 projecting from piston 6, and a finger 18 adapted to engage the main slide valve 12.

The release control device 2 comprises a flexible diaphragm 19, the outer annular portion of which is clamped between a face on the casing and a cover plate 20. Said diaphragm has at one side a chamber 21 and at the other side a chamber 22 open to the atmosphere at all times through an atmospheric passage 23 and containing a slide valve 24 adapted to be operated by deflection of said diaphragm. Said slide valve is operatively mounted between spaced shoulders 25 on a stem 27 having at one end an enlarged plate-like head portion 28 engaging the diaphragm 19. The other end of the stem 27 is acted upon by a spring 29 for urging the slide valve 24 to the position shown in the drawing. A spring-pressed plunger 35 is provided for holding the slide valve 24 in engagement with its seat.

The retaining valve device 3 may be of any well known construction adapted to be connected to the brake cylinder release pipe 30 and is provided with an operating handle 31 having a "turned down" or cut out position, as shown in the drawing, and in which the brake cylinder is permitted to freely exhaust to the atmosphere, and a "turned up" or cut in position substantially 90° from that shown in the drawing and in which the exhaust of fluid under pressure from the brake cylinder is restricted down to a certain degree at which the retaining valve closes and holds the remaining fluid under pressure in the brake cylinder, in the usual well known manner.

In operation, to initially charge the brake system, fluid under pressure supplied to the brake pipe 9, flows to the triple valve piston chamber 7 and thence around the piston 6 to the valve chamber 10 either by way of passages 34 and 33, if the piston 6 is in the full release position, or by way of passage 34 and chokes 36 and 40 if the piston 6 is in the retarded or inner release position, so as to charge the valve chamber 10 and auxiliary reservoir 4 with fluid under pressure.

The brakes are applied in the usual manner by effecting a reduction in pressure in the brake pipe 9. The pressure of fluid in valve chamber 10 then shifts the piston 6 and slide valves 12 and 13 to application position in which fluid under pressure is supplied from the auxiliary reservoir 4 through valve chamber 10, port 50 in the main slide valve 12, and passage and pipe 45 to the brake cylinder 5, thereby applying the brakes.

When it is desired to release the brakes, the brake valve device is first turned to full release position and then after a predetermined lapse of time to running position. Due to this brake valve operation, the rate at which the brake pipe pressure initially increases at the head end of the train is rapid, but at the rear end of the train, the rate of increase in brake pipe pressure is relatively slow due to the resistance to flow of fluid under pressure through said brake pipe, and initially the brake pipe pressure obtained at the head end of the train is high and may approach that carried in the main reservoir.

At the head end of the train where the rate of increase in brake pipe pressure is rapid, the piston 6 and slide valves 12 and 13 are moved toward release position. When the piston 6 moves over the passage 34, communication is established between piston chamber 7 and valve chamber 10, but the flow capacity of passage 34 is insufficient to offset the rapid rate of increase in brake pipe pressure, so that said piston and the valves 12 and 13 are moved to retarded release position, in which the piston engages a stop rib 32. In moving to retarded release position, the piston stem 17 engages lug 16 of member 26 and shifts said member toward the right hand against the pressure of spring 15.

In this retarded release or inner position, passage 33 is lapped by the piston 6 so as to prevent direct flow of fluid under pressure from piston chamber 7 to valve chamber 10 and fluid under pressure supplied to passage 34 flows through choke 36 to passage 37 and from thence through choke 40 and passage 41 to valve chamber 10 and auxiliary reservoir 4.

In the retarded release position of the slide valve 12, the brake cylinder 4 is connected to the atmosphere through pipe and passage 45, cavity 46 in slide valve 12, the retarded release choke 48, port 49, passage and pipe 30 and the retaining valve device 3. The choke 48 limits the rate of flow of fluid under pressure from the brake cylinder when the retaining valve device is cut out, and as a result the passage and pipe 30 and the connected diaphragm chamber 21 are at substantially atmospheric pressure. Spring 29 thus holds the diaphragm 19 and slide valve 24 in the position shown in the drawing, in which fluid under pressure is permitted to flow from passage 37 through the outlet choke 38, passage 39, cavity 43 in slide valve 24, passage 44 and port 45 in the main slide valve 12 to cavity 46 which is in open communication with the brake cylinder 5.

In the manner above described, fluid under pressure supplied through choke 36 to passage 37 flows partly to the valve chamber 10 and auxiliary reservoir 4 through the choke 40 and partly through choke 38 to cavity 46 in main slide valve 12 through which fluid under pressure is being vented from the brake cylinder 5.

The choke 36 has a predetermined flow area which when arranged in series with choke 40, and when choke 38 is ineffective, is adapted to supply fluid under pressure to valve chamber 10 and auxiliary reservoir 4 at a certain predetermined desirable rate, as in releasing the brakes in "cycling" as will be hereinafter fully described. This predetermined desirable rate is faster however than is desired in the usual release after an application at the head end of the train, so in order to reduce the flow rate of chokes 36 and 40, arranged in series, the outlet through choke 38 is provided to reduce the flow through choke 40 and consequently hold back the rate at which the valve chamber 10 and reservoir 4 normally become charged with fluid under pressure.

In addition to holding back the charging of the auxiliary reservoir at the head end of the train so as to accelerate charging of the brake pipe at the rear end of the train, it is also desirable to retard the release of brakes at the head end of the train so as to effect a substantially uniform release of brakes throughout the entire train. In order to accomplish this, fluid under pressure vented from passage 37 through choke 38 flows to the brake cylinder cavity 46 in the main slide valve 12, through passage 39, cavity 43 in the slide valve 24, passage 44 and port 45 in the main valve 12. Thus, at the same time as fluid under pressure from the brake cylinder 5 is being vented from cavity 46 to the atmosphere through the choke 48, port 49, passage and pipe 30 and the retaining valve device 3, fluid under pressure is also being supplied to cavity 46 at a slower rate through choke 38, which retards the venting of fluid under pressure from said brake cylinder.

The flow capacity of choke 48 is fixed for permitting a certain rate of venting of fluid under pressure from the brake cylinder 5 in "cycling", when the release control device 2 is inoperative, as will be hereinafter fully described. The "cycling" rate is faster however than desired in the ordinary release of brakes, and is reduced by the supply of fluid under pressure through choke 38, in the manner above described.

When the pressure differential on piston 6 is reduced to a predetermined degree upon movement of the brake valve device to running position, the pressure of spring 15 moves the piston 6 and slide valves 12 and 13 to full release position shown in the drawing, in which position passage 33 is uncovered by piston 6 and fluid under pressure then flows from piston chamber 7 to valve chamber 10 at a faster rate by way of ports 34 and 33. In the full release position, passage 44 is lapped so as to prevent further flow of fluid under pressure through choke 38, and the brake cylinder 5 is opened directly to the atmosphere through pipe and passage 45, cavity 46 in the slide valve 12, passage and pipe 30 and the retaining valve device 3.

At the rear end of the train, the slower rate of increase in brake pipe pressure moves the triple valve piston 6 and slide valves 12 and 13 to the full release position in which further movement is prevented by the pressure of spring 15. In full release position, fluid under pressure flows through passages 34 and 33 to valve chamber 10 and the auxiliary reservoir 4 so as to charge said reservoir, and the brake cylinder 5 is opened to the atmosphere through pipe and passage 45, cavity 46 in the main slide valve 12, passage and pipe 30 and the retaining valve device 3, thereby permitting fluid under pressure to be vented from said brake cylinder to effect a release of the brakes.

When "cycling" the brakes, the retaining valve device 3 is turned to the cut in position so that in releasing the brakes after an application effected in the manner hereinbefore described, the retaining valve device will so restrict the release of fluid at brake cylinder pressure from pipe 30 as to permit fluid under pressure to flow through passage 42 to diaphragm chamber 21 of the release control valve device 2. When the brake cylinder pressure is reduced through the retaining valve device to a predetermined degree, the retaining valve device operates in the usual manner to prevent further reduction in brake cylinder pressure.

The pressure of fluid thus supplied to diaphragm chamber 21 deflects said diaphragm and shifts the slide valve 24 toward the left against the opposing pressure of spring 29 and until the head portion 28 of stem 27 engages the casing. In this left hand position of the slide valve 24, communication between passages 39 and 44 is closed, so that at the head end of the train where the rapid rate of increase in brake pipe pressure moves the piston 6 and slide valves 12 and 13 to their inner position, the outlet through choke 38 is closed and the rate of charging of the valve chamber 10 and auxiliary reservoir 4 is entirely controlled by the flow capacities of the two chokes 36 and 40, arranged in series. It will thus be evident that in cycling, the auxiliary reservoir 4 at the head end of the train is charged more rapidly than when the brakes are being normally released, as hereinbefore described.

At the rear end of the train, the release control valve device 2 operates in the same manner as at the front end, but since the piston 6 and slide valves 12 and 13 move only to full release position at the rear end of the train, passage 44 is maintained lapped and the operation of the release control valve device has no control of the rate of charging of the valve chamber 10 and auxiliary reservoir 4.

It will be noted that according to my invention, I provide a brake controlling valve device having improved means for controlling the charging of the auxiliary reservoir and the venting of fluid under pressure from the brake cylinder in accordance with the rate of increase in brake pipe pressure from the front toward the rear end of a train, and when the retaining valve device is employed in "cycling", the brake controlling valve device provides still another rate of charging for the auxiliary reservoir at the head end of a train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, and a reservoir, of a brake controlling valve device operative upon an increase in brake pipe pressure to release fluid under pressure from the brake cylinder and to supply fluid under pressure from said brake pipe to said auxiliary reservoir and to the communication through which fluid is released from said brake cylinder.

2. In a fluid pressure brake, the combination with a brake pipe, a brake cylinder, and a reservoir, of a brake controlling valve device operative upon an increase in brake pipe pressure to release fluid under pressure from the brake cylinder and to supply fluid under pressure from said brake pipe to said auxiliary reservoir and to the communication through which fluid is released from said brake cylinder, and valve means operative by fluid released from the brake cylinder for cutting off the supply of fluid under pressure from said brake pipe to said communication.

3. In a fluid pressure brake, the combination with a brake pipe, a brake cylinder, and a reservoir, of a brake controlling valve device operative upon an increase in brake pipe pressure to release fluid under pressure from the brake cylinder and to supply fluid under pressure from said brake pipe to said auxiliary reservoir and to the communication through which fluid is released from said brake cylinder, a retaining valve device operative to retain fluid under pressure in said brake cylinder, and valve means operative by fluid under pressure retained in the brake cylinder for rendering said brake controlling device inoperative to supply fluid under pressure to said communication.

4. In a fluid pressure brake, the combination with a brake pipe, a brake cylinder, and a reservoir, of a brake controlling valve device operative upon an increase in brake pipe pressure to release fluid under pressure from the brake cylinder to supply fluid under pressure from said brake pipe to said auxiliary reservoir and to the communication through which fluid is released from said brake cylinder, a retaining valve device operative to retain fluid under pressure in said brake cylinder, and valve means operative by the pressure of fluid retained by said retaining valve device for cutting off the venting of fluid from the brake pipe to said communication.

5. In a fluid pressure brake, the combination with a brake pipe, a brake cylinder, and a reservoir, of a brake controlling valve device operative upon an increase in brake pipe pressure to release fluid under pressure from the brake cylinder and to supply fluid under pressure from said brake pipe to said auxiliary reservoir and to the communication through which fluid is released from said brake cylinder, a retaining valve device having a cut-in position for restricting the release of fluid under pressure from the brake cylinder, and valve means operative by brake cylinder pressure when said retaining valve device is cut in to cut off the supply of fluid under pressure from said brake pipe to said communication.

6. In a fluid pressure brake, the combination with a brake pipe, and an auxiliary reservoir, of a brake controlling valve device having two release positions in which fluid under pressure is supplied from said brake pipe to said auxiliary reservoir and movable to one or the other of said release positions in accordance with the rate of increase in brake pipe pressure, and valve means operative in one of said release positions for providing two different rates of supply of fluid under pressure from said brake pipe to said auxiliary reservoir.

7. In a fluid pressure brake, the combination with a brake pipe, and an auxiliary reservoir, of a brake controlling valve device having two release positions in which fluid under pressure is supplied from said brake pipe to said auxiliary reservoir and movable to one or the other of said release positions in accordance with the rate of increase in brake pipe pressure, and valve means operative in one of said release positions for reducing the rate at which fluid under pressure is supplied from said brake pipe to said auxiliary reservoir.

8. In a fluid pressure brake, the combination with a brake pipe, an auxiliary reservoir and a brake cylinder, of a brake controlling valve device operative upon a reduction in brake pipe pressure to supply fluid under pressure from said auxiliary reservoir to said brake cylinder and movable upon an increase in brake pipe pressure to one or the other of two release positions in accordance with the rate of increase in brake pipe pressure for venting fluid under pressure from said brake cylinder and for supplying fluid under pressure from the brake pipe to said auxiliary reservoir, and valve means operative in one of said release positions to supply fluid under pressure to the communication through which fluid under pressure is released from said brake cylinder for retarding the release of fluid under pressure from said brake cylinder and for reducing the flow of fluid under pressure to said auxiliary reservoir.

9. In a fluid pressure brake, the combination with a brake pipe, a brake cylinder, and a brake controlling valve device having a release position for venting fluid under pressure from said brake cylinder to effect a release of the brakes, of valve means for venting fluid under pressure from the brake pipe to the communication through which fluid is released from said brake cylinder for retarding the release of fluid from said brake cylinder.

10. In a fluid pressure brake, the combination with a brake pipe, a brake cylinder, and a brake controlling valve device having a release position for venting fluid under pressure from said brake cylinder to effect a release of the brakes, of a retaining valve device having a position for retaining fluid in the brake cylinder, and valve means for venting fluid from the brake pipe to the communication through which fluid is released from the brake cylinder whereby the flow of fluid from the brake pipe retards the release of fluid from the brake cylinder, said valve means being operative by fluid retained in the brake cylinder for cutting off the flow of fluid from the brake pipe to said communication.

11. In a fluid pressure brake, the combination with a brake pipe, an auxiliary reservoir and a brake controlling valve device subject to the opposing pressures of the brake pipe and auxiliary reservoir and having a restricted passageway through which fluid under pressure is supplied from said brake pipe to said auxiliary reservoir in one position of said valve device, of means for reducing the flow of fluid from the brake pipe to the auxiliary reservoir through said passageway to less than that due to said restricted passageway.

12. In a fluid pressure brake, the combination with a brake pipe, an auxiliary reservoir and a brake controlling valve device subject to the opposing pressures of the brake pipe and auxiliary reservoir and having a restricted passageway through which fluid under pressure is supplied from said brake pipe to said auxiliary reservoir in one position of said valve device, of means for venting fluid under pressure from said passageway for reducing the flow of fluid from the brake pipe to the auxiliary reservoir through said passageway to a degree less than that due to said restricted passageway.

13. In a fluid pressure brake, the combination with a brake pipe, an auxiliary reservoir and a brake controlling valve device subject to the opposing pressures of the brake pipe and auxiliary reservoir and having a restricted passageway through which fluid under pressure is supplied from said brake pipe to said auxiliary reservoir in one position of said valve device, of means for partially diverting flow of fluid from the brake pipe through said passageway to the auxiliary reservoir for reducing the flow of fluid through said passageway to said auxiliary reservoir.

In testimony whereof I have hereunto set my hand, this 3rd day of February, 1931.

CLYDE C. FARMER.